(12) United States Patent
Chilson et al.

(10) Patent No.: US 8,075,243 B2
(45) Date of Patent: Dec. 13, 2011

(54) AUTOMATIC TRANSPORT LOADING SYSTEM AND METHOD

(75) Inventors: Gerald Edward Chilson, Alanson, MI (US); Mark Marino, Petoskey, MI (US); Christopher James Simon, Cheboygan, MI (US); Mark Andrew Stevenson, Traverse City, MI (US)

(73) Assignee: Jervis B. Webb Company, Farmington Hills, MI (US)

( * ) Notice: Subject to any disclaimer, the term of this patent is extended or adjusted under 35 U.S.C. 154(b) by 0 days.

(21) Appl. No.: 12/100,722

(22) Filed: Apr. 10, 2008

(65) Prior Publication Data

US 2008/0189005 A1    Aug. 7, 2008

Related U.S. Application Data

(62) Division of application No. 11/119,588, filed on May 2, 2005, now Pat. No. 7,648,329.

(60) Provisional application No. 60/567,729, filed on May 3, 2004.

(51) Int. Cl.
*B65G 67/02* (2006.01)
(52) U.S. Cl. ........... 414/809; 180/167; 318/587; 701/50
(58) Field of Classification Search .......... 414/390–392, 414/399, 809; 701/26, 221
See application file for complete search history.

(56) References Cited

U.S. PATENT DOCUMENTS

| | | |
|---|---|---|
| 3,294,178 A | 12/1966 | Lawson et al. |
| 3,768,586 A | 10/1973 | Thompson et al. |
| 3,780,893 A | 12/1973 | Lassig et al. |
| 3,993,156 A | 11/1976 | Rubel |
| 4,006,790 A | 2/1977 | Kawano et al. |
| 4,079,803 A | 3/1978 | Takada et al. |
| 4,309,758 A | 1/1982 | Halsall et al. |
| 4,328,545 A | 5/1982 | Halsall et al. |
| 4,347,573 A | 8/1982 | Friedland |
| 4,437,533 A | 3/1984 | Bierkarre et al. |
| 4,456,088 A | 6/1984 | Nishiki et al. |
| 4,491,918 A * | 1/1985 | Yuki et al. ....................... 701/50 |
| 4,530,056 A | 7/1985 | MacKinnon et al. |
| 4,566,032 A | 1/1986 | Hirooka et al. |
| 4,595,331 A | 6/1986 | Thompson et al. |
| 4,630,216 A | 12/1986 | Tyler et al. |
| 4,656,406 A | 4/1987 | Houskamp |
| 4,668,859 A | 5/1987 | Winterer |
| 4,714,399 A | 12/1987 | Olson |
| 4,716,530 A | 12/1987 | Ogawa et al. |

(Continued)

FOREIGN PATENT DOCUMENTS

DE    3741259 A1    6/1989

(Continued)

OTHER PUBLICATIONS

Jervis B. Webb Company, Automatic Truck Unloading with AGVs, 2001, 3 pages, Jervis B. Webb Company, Farmington Hills, MI, USA.

(Continued)

*Primary Examiner* — James Keenan
(74) *Attorney, Agent, or Firm* — Dickinson Wright PLLC

(57) ABSTRACT

A method and system for automatically loading and unloading a transport is disclosed. A first guidance system is used to travel near the transport and a second guidance system is used to travel on the transport.

17 Claims, 4 Drawing Sheets

U.S. PATENT DOCUMENTS

| | | | |
|---|---|---|---|
| 4,727,492 A | 2/1988 | Reeve et al. |
| 4,729,660 A | 3/1988 | Tsumura et al. |
| 4,736,812 A | 4/1988 | Livneh |
| 4,777,601 A | 10/1988 | Boegli |
| 4,780,817 A | 10/1988 | Lofgren |
| 4,788,498 A | 11/1988 | Uemura |
| 4,800,977 A | 1/1989 | Boegli et al. |
| 4,802,096 A | 1/1989 | Hainsworth et al. |
| 4,811,227 A | 3/1989 | Wikstrom |
| 4,811,228 A * | 3/1989 | Hyyppa .................... 701/25 |
| 4,815,008 A | 3/1989 | Kadonoff et al. |
| 4,816,998 A | 3/1989 | Ahlbom |
| 4,817,000 A | 3/1989 | Eberhardt |
| 4,817,750 A | 4/1989 | Ishida et al. |
| 4,846,297 A | 7/1989 | Field et al. |
| 4,847,769 A | 7/1989 | Reeve |
| 4,855,915 A | 8/1989 | Dallaire |
| 4,869,635 A | 9/1989 | Krahn |
| 4,906,159 A | 3/1990 | Sabo et al. |
| 4,939,650 A | 7/1990 | Nishikawa |
| 4,941,794 A | 7/1990 | Hara et al. |
| 4,950,118 A * | 8/1990 | Mueller et al. ............. 414/274 |
| 4,968,209 A | 11/1990 | Noble |
| 4,990,841 A | 2/1991 | Elder |
| 5,015,145 A | 5/1991 | Angell et al. |
| 5,052,882 A | 10/1991 | Blau et al. |
| 5,058,023 A | 10/1991 | Kozikaro |
| 5,072,222 A | 12/1991 | Fockens |
| 5,075,853 A | 12/1991 | Luke, Jr. |
| 5,095,214 A | 3/1992 | Eder |
| 5,175,415 A | 12/1992 | Guest |
| 5,202,832 A | 4/1993 | Lisy |
| 5,218,556 A | 6/1993 | Dale, Jr. |
| 5,219,036 A | 6/1993 | Schwager et al. |
| 5,231,374 A | 7/1993 | Larsen et al. |
| 5,244,055 A | 9/1993 | Shimizu |
| 5,276,618 A | 1/1994 | Everett, Jr. |
| 5,280,431 A | 1/1994 | Summerville et al. |
| 5,281,901 A | 1/1994 | Yardley et al. |
| 5,329,132 A | 7/1994 | Van de Pas et al. |
| 5,341,130 A | 8/1994 | Yardley et al. |
| 5,367,456 A | 11/1994 | Summerville et al. |
| 5,404,087 A | 4/1995 | Sherman |
| 5,434,781 A | 7/1995 | Alofs et al. |
| 5,446,356 A | 8/1995 | Kim |
| 5,450,320 A | 9/1995 | Tsubaki et al. |
| 5,455,669 A | 10/1995 | Wetteborn |
| 5,467,084 A | 11/1995 | Alofs et al. |
| 5,524,723 A | 6/1996 | Gramling et al. |
| 5,525,884 A | 6/1996 | Sugiura et al. |
| 5,594,448 A | 1/1997 | d'Hont |
| 5,617,023 A | 4/1997 | Skalski |
| 5,619,207 A | 4/1997 | d'Hont |
| 5,652,593 A | 7/1997 | Rench et al. |
| 5,672,947 A | 9/1997 | Hisada et al. |
| 5,745,235 A | 4/1998 | Vercammen et al. |
| 5,764,014 A | 6/1998 | Jakeway et al. |
| 5,801,506 A * | 9/1998 | Netzler .................... 318/587 |
| 5,803,701 A | 9/1998 | Filiberti et al. |
| 5,804,942 A | 9/1998 | Jeong |
| 5,825,481 A | 10/1998 | Alofs et al. |
| 5,831,717 A | 11/1998 | Ikebuchi |
| 5,916,285 A | 6/1999 | Alofs et al. |
| 5,925,080 A | 7/1999 | Shimbara et al. |
| 5,938,710 A | 8/1999 | Lanza et al. |
| 5,949,530 A | 9/1999 | Wetteborn |
| 5,991,011 A | 11/1999 | Damm |
| 6,049,745 A | 4/2000 | Douglas et al. |
| 6,092,010 A | 7/2000 | Alofs et al. |
| 6,128,585 A | 10/2000 | Greer |
| 6,241,453 B1 * | 6/2001 | Upmeyer .................... 414/667 |
| 6,259,979 B1 * | 7/2001 | Holmquist .................... 701/23 |
| 6,272,406 B2 | 8/2001 | Alofs et al. |
| 6,305,295 B1 | 10/2001 | Buck |
| 6,308,118 B1 | 10/2001 | Holmquist |
| 6,308,134 B1 | 10/2001 | Croyle et al. |
| 6,377,888 B1 | 4/2002 | Olch |
| 6,379,107 B1 | 4/2002 | Iwasaki et al. |
| 6,437,561 B1 | 8/2002 | Bartingale et al. |
| 6,539,294 B1 | 3/2003 | Kageyama |
| 6,650,407 B2 | 11/2003 | Jamieson et al. |
| 6,650,425 B2 | 11/2003 | Kubota et al. |
| 6,732,024 B2 | 5/2004 | Wilhelm Rekow et al. |
| 6,741,364 B2 | 5/2004 | Lange et al. |
| 6,778,092 B2 | 8/2004 | Braune |
| 6,813,548 B2 | 11/2004 | Matsumoto et al. |
| 7,153,081 B2 | 12/2006 | Watanabe |
| 2001/0001843 A1 | 5/2001 | Alofs et al. |
| 2002/0099481 A1 | 7/2002 | Mori |
| 2003/0106731 A1 | 6/2003 | Marino et al. |
| 2003/0165373 A1 | 9/2003 | Felder et al. |
| 2003/0234325 A1 | 12/2003 | Marino et al. |
| 2004/0122570 A1 | 6/2004 | Sonoyama et al. |
| 2005/0244259 A1 | 11/2005 | Chilson et al. |
| 2006/0178828 A1 | 8/2006 | Moravec |
| 2006/0276958 A1 | 12/2006 | Crumbaugh |

FOREIGN PATENT DOCUMENTS

| | | |
|---|---|---|
| EP | 0556689 A2 | 8/1993 |
| EP | 0952427 A2 | 10/1999 |
| EP | 0952427 A3 | 9/2000 |
| GB | 2143395 A | 2/1985 |
| GB | 2158965 A | 11/1985 |
| JP | 59075315 A | 4/1984 |
| JP | 62269899 A | 11/1987 |
| WO | WO 92/09941 | 6/1992 |

OTHER PUBLICATIONS

Scheding, S., Experiments in Autonomous Underground Guidance, Proceedings of the 1997 IEEE International Conference on Robotics and Automation, Apr. 1997, pp. 1898-1903, Albuquerque, New Mexico.

SGV DockPro, Automated Trailer Loading System; JBT Trailer Loading Brochure; 3 pages; http://www.jbtcorporation.com/.

Trailer Loading Application; Kraft Trailer Loading Case Study; 2 pages; http://www.jbtcorporation.com/.

Hagemann, A.; NAV 200 SICK Navigation; Jan. 2008; pp. 1-67; http://www.sick.com/.

ATL Solutions Automatic Trailer Loading & Unloading; 6 pages; http://www.egemin.com.

* cited by examiner

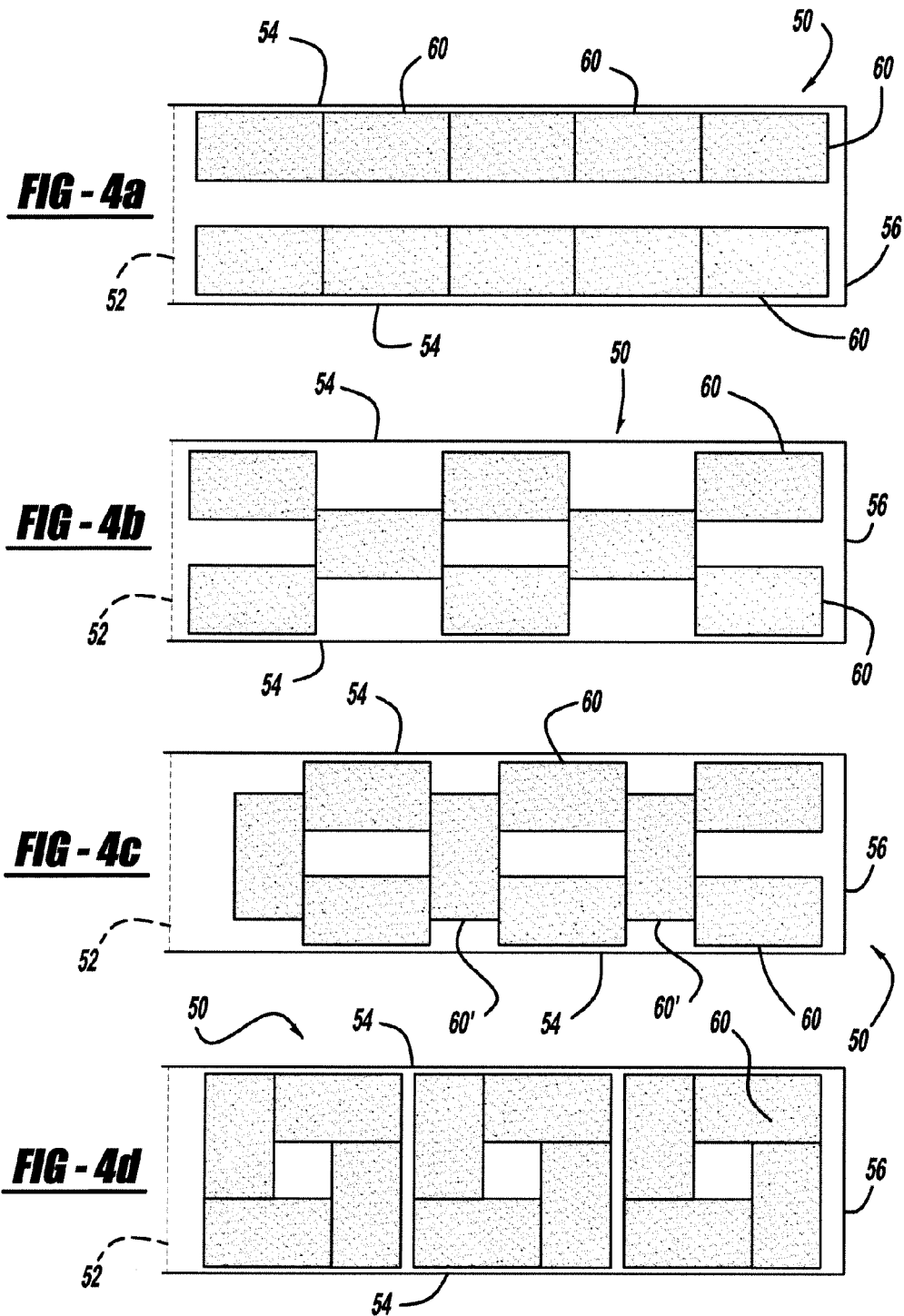

AUTOMATIC TRANSPORT LOADING SYSTEM AND METHOD

CROSS-REFERENCE TO RELATED APPLICATION

This application is a divisional of U.S. patent application Ser. No. 11/119,588, filed May 2, 2005, which claims the benefit of U.S. Provisional Application No. 60/567,729, filed May 3, 2004, the entire disclosure of these applications being considered part of the disclosure of this application and hereby incorporated by reference.

BACKGROUND OF THE INVENTION

The present invention is generally directed to material handling vehicles and, more particularly, to an automatic guided vehicle that is capable of automatically loading and unloading a transport, for example, a tractor trailer, a rail car, a flatbed trailer or a shipping container.

Automatic guided vehicles (AGVs) are used throughout the material handling industry to transport loads. The term AGV is commonly used to refer to robust vehicle designs having any of a number of available automated guidance systems. Automatic guided carts (AGCs) is a term commonly used to refer to a less robust vehicle used for similar but less complicated applications. Throughout this application, including the claims, the term AGV shall mean and include both AGV's and AGC's, as well as any other vehicle that is automatically guided.

Current AGV designs generally include a frame with swivel castors located at the four corners of the frame. Other features may include a drive wheel assembly and rigid castors for directional control of the cart. In one current design, two rigid castors are fixed to the frame and located approximately midway between the swivel castors on each side of the cart frame. The two pair of swivel castor axes and the rigid castor axis are generally parallel to each other. The steerable driving unit is attached to the cart frame, generally by way of a plate that is hinged and spring loaded from the cart frame to ensure that the steerable drive wheel maintains adequate traction with the support surface. In another embodiment, a fixed drive wheel propels the AGV and a steerable castor wheel directs the movement of the AGV.

An AGV includes a guidance system that controls its movement. Known guidance systems in use today include wire guidance, laser guidance, magnetic tape guidance, odometry guidance, inertial guidance and optical guidance, and each have their own associated positives and negatives. For example, inertial guidance is susceptible to tracking errors, where the travel distance and direction measured by the AGV differs from the actual distance and direction of travel. Though they can be minimized, tracking errors may compound over long travel distances and the system must adjust for these errors, for example, by utilizing waypoint reference markers (magnetic paint, Radio Frequency Identification (RFID) tags, etc.) along the designated path.

Laser guidance systems use special markers that the AGV senses and uses to control its travel. This type of system is susceptible to obstruction of markers and, most notably, requires markers to be present in any environment of travel. If the path of the AGV is modified, the markers must be physically moved. Further, an AGV with this type of guidance system can only travel in areas that have these special markers, which, in the context of this invention, requires that any transport to be loaded or unloaded include markers.

One difficulty associated with the automatic loading and unloading of a transport is the varying position of the transport in relation to the fixed loading dock position. Transports are usually positioned manually, for example by a driver in the case of a truck. This manual positioning results in an unknown variability in the position of the transport. As a driver positions the trailer at the loading dock, he or she may be unable to perfectly square the trailer with the dock door. This will leave the trailer at a skewed angle in reference to the dock door. Since the angle is unknown and can vary at each positioning at the dock, an AGV cannot effectively guide and deliver loads in the trailer without having the capability of detecting and compensating for this trailer skew. The prior art has addressed this problem by using skid plates to position the transport in relation to the loading docks, however this is a costly and inefficient process.

Another difficulty associated with the automatic loading and unloading of a transport is that the AGV must be able to overcome the difference in height between the transport and the dock. Different types of transports, as well as different styles of the same transport, will vary in height. Furthermore, the height of a particular transport is not static; as trailer is loaded the suspension will compress, resulting in a change in the height of the transport. In order to allow robust operation, the AGV must be able to operate with varying transport height and, therefore, varying height differences between the transport and dock. The prior art has addressed this problem by using hydraulic or other types of jacks to stabilize and level the transport, however this is another costly and inefficient process.

The use of a loading ramp between the dock and the transport is often used to ease the transition between the two. However, a steep incline or decline between dock and transport can cause guidance difficulties. For example, an AGV that uses a laser guidance system may lose the target as it moves up an incline, or down a decline, due to the fact that the laser will be pointing either above or below the target.

The variability in position of the transport may prohibit the automatic loading of the truck, and almost certainly will reduce its efficiency. For example, the most efficient loading process positions the loads as closely to each other as possible, and any variability in the expected position of the transport will tend to increase the separation of the loads.

Despite the use of guidance systems to control travel of an AGV, their use in the process of loading and unloading loads from a transport has yet to be satisfactorily addressed in the art.

SUMMARY OF THE INVENTION

In view of the above, a need exists for an AGV design that effectively and efficiently combines the use of different guidance systems to automatically load and unload a transport. More particularly, a need exists for an AGV design that is capable of loading and unloading a transport that may not be in its expected position.

To meet these and other needs that will be apparent to those skilled in the art based upon this description and the appended drawings, the present invention is directed to a method and system for loading and unloading a transport by an AGV. The AGV first engages a load. The AGV with engaged load is then guided by a first guidance system to a known position. From this position, a second guidance system is enabled to guide the AGV to the proper load position on the transport, at which point the load is deposited. The second guidance system is then used to guide the AGV back to approximately the known position described above, wherein the first guidance system then resumes its control of the travel of the AGV.

In another embodiment of the present invention, the AGV first engages a load. The AGV with engaged load is then guided by a guidance system to a known position. From this position, the guidance system determines the proper load position on the transport, adjusts itself to guide the AGV with the load to that position, and deposits the load. The adjusted guidance system is then used to guide the AGV back to approximately the known position described above, wherein the original unadjusted guidance system then resumes its control of the travel of the AGV.

Further scope and applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

FIGS. 4a-d are overhead views of a loaded transport according to the present invention.

DETAILED DESCRIPTION OF THE PREFERRED EMBODIMENT

Figure 1:
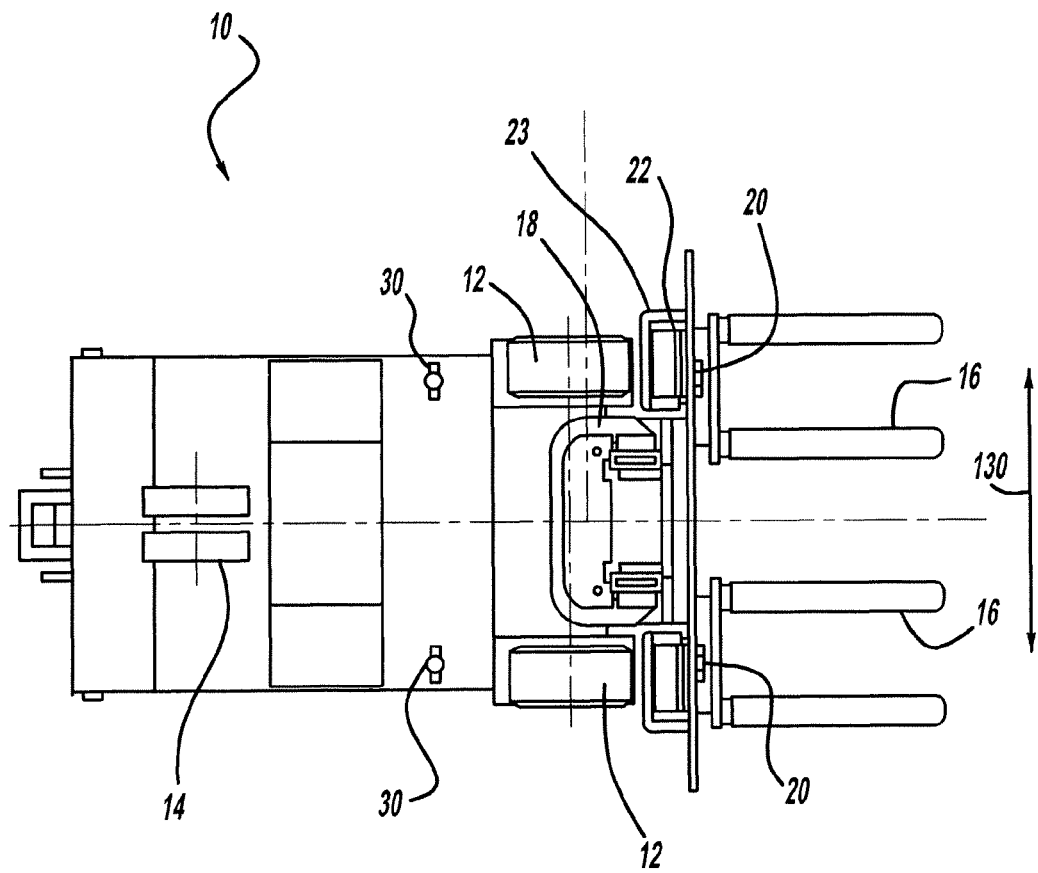
FIG. 1 is an overhead view of an AGV according to the present invention.
Figure 2:
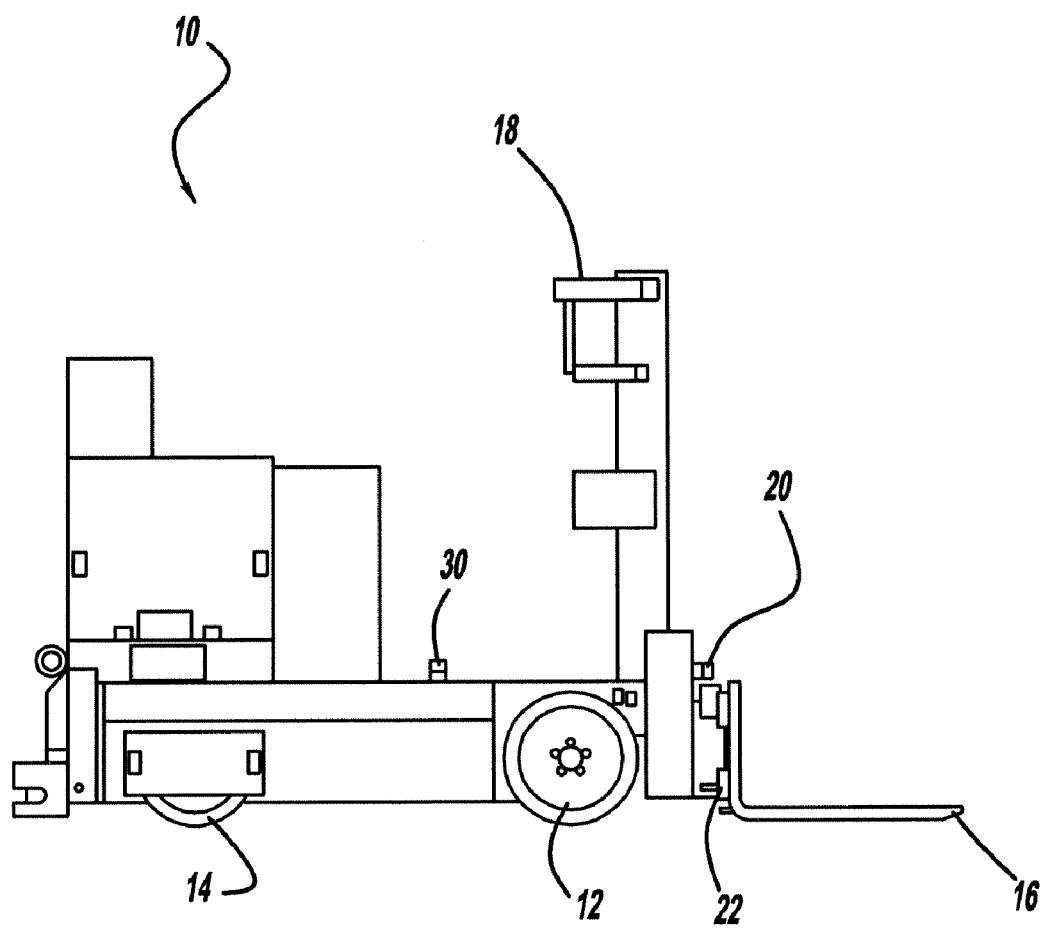
FIG. 2 is a side view of an AGV according to the present invention.
Figure 3:
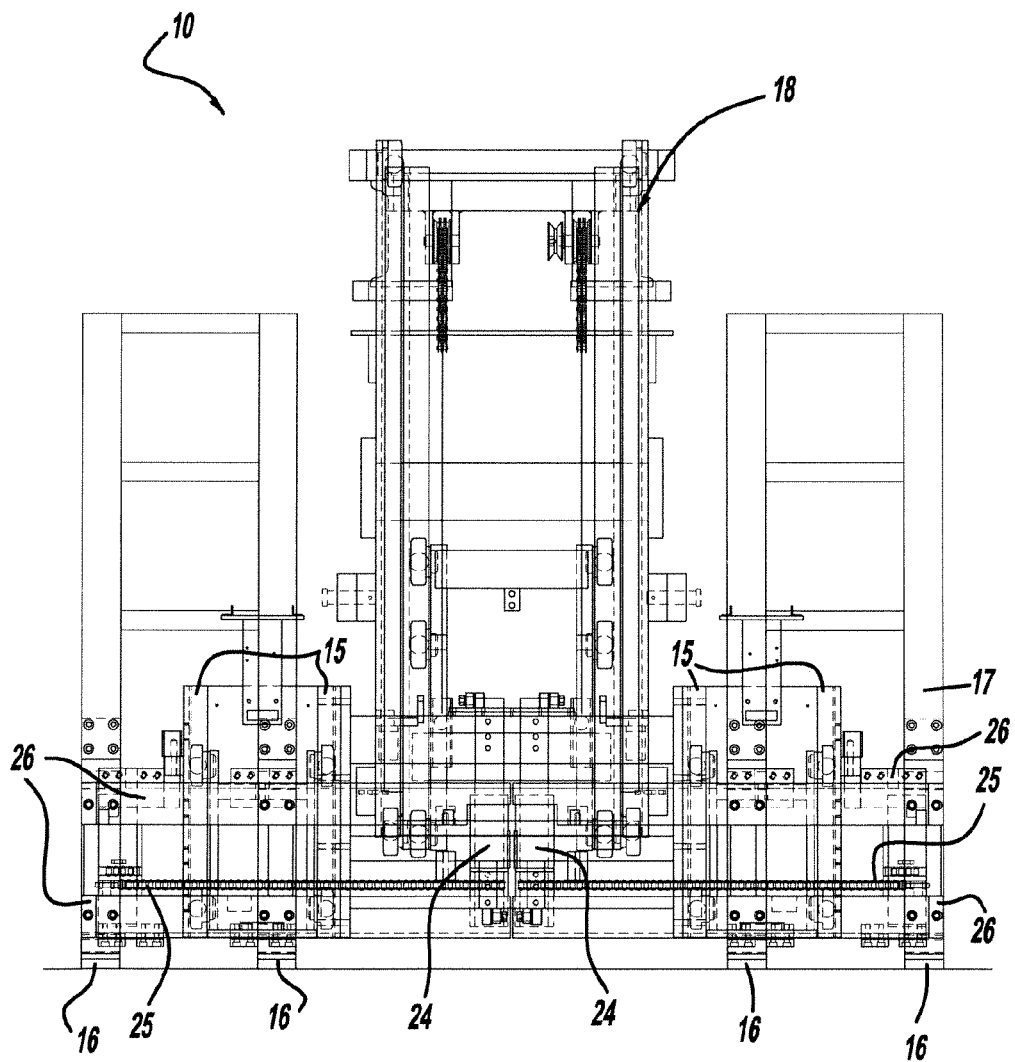
FIG. 3 is a front view of an AGV according to the present invention.

An automated guided vehicle 10 according to the present invention is illustrated and described with reference to FIGS. 1-4. It should be appreciated that the applications for the automatic loading and unloading of a transport according to the present invention may be used in a variety of applications beyond the illustrated AGV. For example, the present invention may be used with automated guided vehicles of a variety of configurations as well as other material handling vehicles.

The AGV 10 includes a steering and drive mechanism that is used to propel and steer the AGV 10. In the illustrations shown, the steering and drive mechanism comprises drive wheels 12 and steerable wheel 14 that are coupled with a guidance system and used to propel and steer the AGV 10. The guidance system turns the steerable wheel 14 as the AGV 10 is propelled, thus steering the AGV 10. Additionally, the drive wheels 12 are preferably dual drive wheels wired in series to create an electrical differential. Different propulsion systems may also be used, for example differential or "panzer" steer with swivel casters or through the use of master/slave motor controllers for the drive wheels.

The guidance system can be one of any number of known guidance systems. In a preferred embodiment, two guidance systems are used, as more fully described below. The primary guidance system is an inertial guidance system. The preferred system uses a programmed path of travel. The position of the steerable wheel 14 is known and is capable of being maneuvered. The distance and direction traveled by the AGV 10 is measured, preferably but not necessarily by a track wheel. A system with encoders on each drive wheel and a steering encoder may be used in conjunction with or separate from the track wheel to track the distance and direction traveled by the AGV 10. As the AGV 10 travels, the steerable wheel 14 is turned to certain positions at certain distances. In this manner, the AGV 10 can be used to travel over almost any surface by just specifying the position of the steerable wheels 14 and the distance to be traveled while in that position. This detailed description is given by illustration only, and the use of a different type of guidance system, for example a laser guidance system, as the primary guidance system is within the spirit and scope of the invention.

The AGV 10 further includes a load capture mechanism, such as clamps or, preferably, the fork pairs 16 shown in the illustrations that are used to engage a load. The load preferably includes fork pockets, usually integrated with a pallet, for engaging with the fork pairs 16, as is well known in the art. The fork pairs 16 may be adjusted vertically by means of an elevator mechanism 18. The elevator mechanism 18 allows the load to be raised or lowered to a variety of heights, for example, for stacking loads onto one another. In a preferred embodiment, the AGV 10 further includes two sets of distance sensors, rear distance measuring devices 20 and front distance measuring devices 30. Both sets of distance measuring devices are operatively coupled to the steering and drive mechanism for use in guiding the AGV 10, as more fully described below.

Preferably, the load capture mechanism described above is capable of shifting the engaged load horizontally by means of a side-shifting mechanism 22. In a preferred embodiment illustrated in FIG. 3, the elevator mechanism 18 is equipped with two fork pairs 16. Each fork pair 16 is mounted to a separate fork carriage 17, and each fork carriage 17 is mounted to the elevator mechanism 18. The elevator mechanism 18 can raise the fork carriages 17 together as needed to vertically position the fork pairs 16 and/or loads. The fork carriages 17 are also mounted on vertical slides 15 and equipped with hydraulic cylinders to allow up to six inches of independent lifting ability per fork pair 16. This independent lifting allows the AGV to travel and position its fork pairs 16 into a pair of adjacent loads. By raising only one fork pair 16 six inches allows the AGV to pick-up a single load from a pair of adjacent loads. This same operation along with the side shifting mechanism 22 allow the AGV to place two loads side by side or in single bin storage racks. Each fork carriage 17 is equipped with hydraulic motor 24 with a chain drive. The chain 25 will pull the fork carriage 17 to the desired position. In a preferred embodiment, the carriage slide rails 26 are designed to allow the fork carriage 17 to travel past center such that the AGV is capable of dropping a load in the center position of the AGV. To do this one fork pair 16 is shifted to one side and out of the way, thus allowing the other fork pair 16 to be positioned at the center of the AGV.

The side-shifting mechanism 22, in conjunction with the elevator mechanism 18 and the forward and backward travel of the AGV 10, allows the load to be adjusted in all three dimensions when engaged to the load capture mechanism of the AGV 10. In a preferred embodiment illustrated in FIG. 1, each of the fork pairs 16 can be independently moved horizontally, i.e., in the directions of arrow 130. Additionally, each of the side-shifting mechanisms 22 includes an encoder 23 for tracking the movement of the fork pairs 16. These encoders 23 preferably are capable of tracking both the position and rate of change in position of the fork pairs 16 in the horizontal direction. These encoders 23 are in communication with the guidance system of the AGV 10 and are used to properly position the fork pairs 16. The horizontal shifting of the fork pairs 16 is described more fully below in conjunction with the description of loading the transport 50.

The AGV 10 as described above is designed to be used in the automatic loading and unloading of a transport 50. These processes will be described in relation to an enclosed truck trailer at a loading dock location of a factory, but similar processes could be described for any similar transport 50, for example a flatbed trailer or rail car.

Automatically Loading a Transport:

In order to load a transport 50, the AGV 10 must first engage the load. In a preferred embodiment, as described above, this is accomplished by the use of fork pairs 16 of the AGV 10 that mate with fork pockets of the load, usually integral with a pallet, and by using the elevator mechanism 18 to lift the load off the ground. The mating of the fork pairs 16 to the fork pockets is a difficult operation, and requires precision. Preferably, the load is placed in a known location with a relatively high degree of precision. The guidance system of the AGV 10 may then be programmed to interact with the load at this known location, so that the fork pairs 16 and fork pockets properly mate with each other. If placing the load into a known position with precision is difficult or impractical, the AGV 10 could be modified to allow for a wider range of load positioning. For example, optical sensors could be positioned on or near the tips of the fork pairs 16 and could be used to detect the fork pockets of the load. When the AGV 10 approaches the load location, these optical sensors could be switched on to find the fork pockets. Based on the detected position of the fork pockets, the AGV 10 would modify its path of travel or, preferably, the fork pairs 16 could be adjusted by means of the side-shifting mechanism 22 such that the forks 16 and fork pockets interact. While this allows more robust operation, the additional components required make this a more expensive and less desirable configuration.

Once the AGV 10 has been loaded, the AGV 10 will travel to the loading dock area of the factory. The transport 50, in this case a truck trailer, will be located adjacent to the loading dock. In some cases, a loading ramp is used in order to facilitate the travel of the AGV 10 from the dock to the transport 50. The loading ramp is designed to ease the transition for the AGV 10 between the two different surfaces. Because this transition may be somewhat uneven, the track wheel, if used, may need to be lifted and rendered inoperable to avoid it being damaged.

The AGV 10 will use its primary guidance system to transport the load to the loading dock and near to the transport 50. In a preferred embodiment, the AGV 10 will use its primary guidance system to move to the threshold of the opening 52 of the transport 50. At this point, a secondary guidance system of the AGV 10 will be enabled and used to guide the AGV 10 into the intended load position. In a preferred embodiment, the secondary guidance system comprises the two sets of distance measuring devices 20 and 30 described above. The rear distance measuring devices 20 are utilized to operate when the AGV 10 is traveling forward, and the front distance measuring devices 30 are utilized to operate when the AGV 10 is traveling backward. The preferred distance measuring devices are analog sonic sensors, though a laser-type, a laser scanner with moving beam-type, or an optical/vision system could be used instead. Each set of the distance measuring devices will operate such that the AGV 10 will seek the middle of the transport 50. This is accomplished by using the sensors such that the distance from one sensor to the side 54 of the transport 50 is subtracted from the distance from the other sensor to the other side 54 of the transport 50 to create a +/- error signal. This +/- error signal can be used by the steering mechanism of the AGV 10 to guide the AGV 10 in the appropriate direction in order to cause the +/- error signal to approach zero. In this manner, the AGV 10 will seek the middle of the transport 50, and therefore compensate for any skew in the positioning of the transport 50 in relation to the loading dock. It is possible to use only one sensor in each set if each transport 50 to be loaded is of a known width. In this embodiment, the distance from the one sensor should be subtracted from the known distance that correlates with the AGV 10 being in the middle of the transport 50 to obtain the +/- error signal, which can be used by the steering mechanism of the AGV 10 to guide the AGV 10 in the appropriate direction in order to cause the +/- error signal to approach zero. In another embodiment, the AGV 10 does not track the middle of the transport 50 but instead maintains a specified distance from one of the sides 54 of the transport 50.

The AGV 10 is guided by the secondary guidance system to the intended load position. Preferably, the intended load position is the frontmost unoccupied section of the transport 50. In the preferred embodiment, the AGV 10 will continue forward in the approximate middle of the transport 50 until detecting the end 56 of the transport 50 or previously loaded loads on the transport 50. This detection may be accomplished by an appropriately configured pressure sensor or sensors. The pressure sensor could be positioned to be on the end of the fork pairs 16 to detect contact with the end wall 56 of the transport 50 or other load or, in a preferred embodiment, a pressure sensor could be positioned on the other end of the fork pairs 16 to interact with the load when the load itself contacts the end wall 56 or other load. In the preferred embodiment, the AGV 10 slows down to a low speed when it approaches the intended load position and the AGV 10 detects bumping of the load with the end 56 of the transport 50 or other load by monitoring the drive current of the motor of the AGV 10. As resistance to travel increases, for example when a relatively immovable object contacts the AGV 10, the current delivered to the electric motor of the AGV 10 similarly increases. This increase in current can be used as the indication the load has reached its intended load position.

Once the AGV 10 has reached the intended load position, the AGV 10 deposits the load. In a preferred embodiment, this comprises lowering the load onto the transport 50 by means of the elevator mechanism 18, and then moving the fork pairs 16 out of engagement with the fork pockets. The step of depositing of the load can also include shifting the fork pairs 16 (with the engaged load) outward towards the side of the transport 50 by means of the side-shifting mechanism 22 before depositing the load. In a preferred embodiment, the load is comprised of two independent pallets, each of which is engaged with one of the fork pairs 16 illustrated in FIG. 1. In this embodiment, when the AGV 10 is approaching the intended load position in the direction of travel of the AGV 10, the side-shifting mechanism 22 begins to shift the fork pairs 16, and the engaged independent pallets, outwardly towards the sides 54 of the transport 50 and away from each other. The encoders 23 track the change in position of the fork pairs 16 during this side shifting. In a preferred embodiment, when the encoders 23 detect that the position of the fork pairs 16 is no longer changing, the load is presumed to have contacted the sides 54 of the transport 50, and the AGV continues to travel in the forward direction until detecting the end 56 of the transport 50 or previously loaded loads on the transport 50, as described above. At this point, the load has reached the intended load position and the load is lowered onto the base of the transport 50.

Various modifications to the embodiments described above can be made without departing from the scope of the claimed invention. For example, an AGV 10 that has only one fork pair 16 can be used with the method of the invention. In this embodiment, the fork pair 16 can be shifted by means of the side-shifting mechanism 22 such that individual loads can be placed at the side 54 of the transport 50. In this manner, the transport 50 can be loaded one load at a time. If desired, the AGV 10 can also alternate the side 54 of the transport 50 on which the load is deposited. Further, this invention allows the AGV 10 to load the transport 50 in any load configuration, e.g., two loads side-by-side from the front to the back of the transport 50 (as in a preferred embodiment illustrated in FIG. 4a), alternating rows of two side-by-side loads and one load in the middle from the front to the back (FIG. 4b), or any other conceivable layout. In the case of asymmetrical loads, the loads can be arranged such that some are rotated with respect to others, as shown in FIG. 4c (in which the loads indicated by 60' are rotated 90° from the alignment of the loads 60) and FIG. 4d (in which the loads 60 are arranged in a "pin-wheel" layout). In the illustrated layouts of FIGS. 4a-d, rectangular loads are shown, however any shape load may be used with the present invention.

Because of the flexibility in position for depositing the loads by the AGV 10, the optimum configuration for the loaded transport 50 can be achieved. In a common arrangement, the transport 50 is loaded such that a minimum amount of empty space (i.e., without a load) is achieved, however, for heavy loads it is possible that the weight limit of the transport 50 would be exceeded in such a configuration. In this type of circumstance, or in another event of a less than fully loaded transport 50, the layout of the loads in the transport 50 can be arranged to minimize shifting of the loads during transport 50. In each case, the AGV 10 and method of the present invention can be utilized to achieve the desired loading of the transport 50.

After depositing the load, the secondary guidance system will then be used to guide the AGV 10 back to approximately the same location where the secondary guidance system was first enabled, in a preferred embodiment the threshold 52 of the transport 50. Once at this location, the primary guidance system will then be used to guide the AGV 10 on its travels, for example, to pick up another load. If a track wheel is used, as in a preferred embodiment, the track wheel is lowered to again contact the ground to be utilized by the first, i.e., inertial, guidance system.

In a preferred embodiment, the primary guidance system will continue to track the motion of the AGV 10 when it is being guided by the secondary guidance system. This continual tracking allows for a more precise resumption of guidance by the primary guidance system.

Automatically Unloading a Transport:

The process of unloading a transport 50 is very similar to the loading process described above. The main difference is that it is difficult to ensure that the load to be picked up is in the proper position on the transport 50, and therefore the AGV 10 must be designed to compensate for this and other variability in the position of the load. A preferred method includes the step of guiding the AGV 10 with a primary guidance system to a position near the transport 50, most preferably at the threshold 52 of the transport 50. At this point, a secondary guidance system, preferably including the analog sonic sensors described above, guides the AGV 10 to mate with the load. As described above, the AGV 10 could be modified to allow for a wider range of load positioning by including optical sensors on or near the forks 16 that could be used to detect the fork pockets of the load. When the AGV 10 approaches the load location on the transport 50, these optical sensors could be switched on to find the fork pockets. Based on the detected position of the fork pockets, the AGV 10 would modify its path of travel or, preferably, the forks 16 could be adjusted by means of fork shifters (i.e., the side shifting mechanism 22 and vertical slides 15 described above) that allow for movement of the fork pairs 16 independently of the AGV 10, such that the fork pairs 16 and fork pockets interact. Once engaged, the load could be lifted by the elevator mechanism 18 of the AGV 10. The secondary guidance system would then guide the AGV 10 back to approximately the same position where it began guiding the AGV 10, i.e., the threshold 52 of the transport 50. At this point, the primary guidance system would then be used to guide the AGV 10 on its travels. In a preferred embodiment, the primary guidance system will continue to track the motion of the AGV 10 when it is being guided by the secondary guidance system so that a more precise resumption of guidance by the primary guidance system is possible.

Another embodiment of the present invention includes the use of the second guidance system to determine the skew of the transport 50 in relation to the loading dock. An inertial guidance system is utilized to guide the AGV 10 to the threshold 52 of the transport 50 to be loaded. At the threshold 52 of the transport 50, the second guidance system, for example comprising a moving beam laser or optical system, is used to determine the skew of the transport 50. This can be accomplished by measuring and comparing the distance to the two sides of the transport 50. Once the skew is determined, the inertial guidance system can be adjusted to compensate for the skew. At this point, the compensated inertial guidance system can be utilized to load or unload the transport 50 in a manner very similar to that described in the examples above.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A method for loading a transport having sides and a threshold with an automatic guided vehicle (AGV) comprising:
   engaging a load with the AGV;
   guiding the AGV with an inertial guidance system to a first position near the threshold of the transport;
   sensing more than one location of at least one of the sides of the transport using a secondary guidance system;
   guiding the AGV past the threshold of the transport using said inertial guidance system after said step of sensing more than one location of at least one of the sides of the transport using a secondary guidance system;
   guiding the AGV within the transport wherein said secondary guidance system uses said locations of said at least one of the sides of the transport to update said inertial guidance system as said inertial guidance system guides the AGV to an intended load position;
   depositing said load onto the transport at said intended load position; and
   guiding the AGV with said inertial guidance system from said intended load position to a second position, after said step of depositing said load onto the transport at said intended load position.

2. The method of claim 1 wherein said secondary guidance system includes at least one distance measuring sensor.

3. The method of claim 2 wherein the transport includes a first sidewall and a second sidewall and wherein said at least one distance measuring sensor determines the distance of the AGV to each sidewall.

4. The method of claim 3 wherein said AGV uses the distance from each sidewall to determine the skew of the transport.

5. The method of claim 2 wherein the transport includes sidewalls and wherein the AGV maintains a specified distance from one of the sidewalls as the AGV moves from said first position to said intended load position.

6. The method of claim 1 wherein said secondary guidance system is one of a laser guidance system, a sonic guidance system, an optical guidance system or a vision guidance system.

7. A method for loading a transport having sides and a threshold with an automatic guided vehicle (AGV) comprising:
 engaging a load with the AGV;
 guiding the AGV with a primary laser guidance system to a first position near the threshold of the transport;
 sensing at said first position more than one location of at least one of the sides of the transport using a secondary laser guidance system;
 guiding the AGV past the threshold of the transport using said primary laser guidance system after said step of sensing at said first position more than one location of at least one of the sides of the transport using a secondary laser guidance system;
 guiding the AGV within the transport wherein said secondary laser guidance system uses said locations of said at least one of the sides of the transport to update said primary laser guidance system as said primary laser guidance system guides the AGV to an intended load position;
 depositing said load onto the transport at said intended load position; and
 guiding the AGV with said primary laser guidance system from said intended load position to a second position.

8. The method of claim 7 wherein the transport includes sidewalls and wherein the AGV maintains a specified distance from one of the sidewalls as the AGV moves from said first position to said intended load position.

9. The method of claim 7 wherein said secondary guidance system includes at least one distance measuring sensor.

10. The method of claim 9 wherein the transport includes a first sidewall and a second sidewall and wherein said at least one distance measuring sensor determines the distance of the AGV to each sidewall.

11. The method of claim 10 wherein said AGV uses the distance from each sidewall to determine the skew of the transport.

12. A method for loading a transport having sides and a threshold with an automatic guided vehicle (AGV) comprising:
 engaging a load with the AGV;
 guiding the AGV with an optical guidance system to a first position near the threshold of the transport;
 sensing at said first position more than one location of at least one of the sides of the transport using a secondary guidance system;
 guiding the AGV past the threshold of the transport using said optical guidance system after said step of sensing at said first position more than one location of at least one of the sides of the transport using a secondary guidance system;
 guiding the AGV within the transport wherein said secondary guidance system uses the locations of said at least one of the sides of the transport to update said optical guidance system as said optical guidance system guides the AGV to an intended load position;
 depositing said load onto the transport at said intended load position; and
 guiding the AGV with said optical guidance system from said intended load position to a second position.

13. The method of claim 12 wherein the transport includes sidewalls and wherein the AGV maintains a specified distance from one of the sidewalls as the AGV moves from said first position to said intended load position.

14. The method of claim 12 wherein said secondary guidance system includes at least one distance measuring sensor.

15. The method of claim 14 wherein the transport includes a first sidewall and a second sidewall and wherein said at least one distance measuring sensor determines the distance of the AGV to each sidewall.

16. The method of claim 15 wherein said AGV uses the distance from each sidewall to determine the skew of the transport.

17. The method of claim 12 wherein said secondary guidance system is one of a laser guidance system, a sonic guidance system, an optical guidance system or a vision guidance system.

* * * * *